United States Patent
Aerts et al.

(10) Patent No.: US 10,114,579 B2
(45) Date of Patent: Oct. 30, 2018

(54) DATA MIGRATION TOOL WITH INTERMEDIATE INCREMENTAL COPIES

(71) Applicant: DATADOBI CVBA, Wilsele (BE)

(72) Inventors: Ives Aerts, Heverlee (BE); Kim Marivoet, Lovenjoel (BE)

(73) Assignee: DATADOBI CVBA, Wilsele (BE)

( * ) Notice: Subject to any disclaimer, the term of this patent is extended or adjusted under 35 U.S.C. 154(b) by 0 days.

(21) Appl. No.: 15/510,154

(22) PCT Filed: Aug. 7, 2015

(86) PCT No.: PCT/EP2015/068227
§ 371 (c)(1),
(2) Date: Mar. 9, 2017

(87) PCT Pub. No.: WO2016/037777
PCT Pub. Date: Mar. 17, 2016

(65) Prior Publication Data
US 2017/0269869 A1   Sep. 21, 2017

(30) Foreign Application Priority Data
Sep. 11, 2014   (EP) ...................................... 14184344

(51) Int. Cl.
*G06F 3/06* (2006.01)
(52) U.S. Cl.
CPC ............ *G06F 3/0647* (2013.01); *G06F 3/061* (2013.01); *G06F 3/067* (2013.01); *G06F 3/0617* (2013.01)
(58) Field of Classification Search
CPC ....... G06F 3/0617; G06F 3/0647; G06F 3/067
See application file for complete search history.

(56) References Cited

U.S. PATENT DOCUMENTS

| 7,743,028 | B1 | 6/2010 | Stringham et al. | |
| 7,873,601 | B1* | 1/2011 | Kushwah | G06F 11/1451 |
| | | | | 707/654 |
| 8,990,162 | B1* | 3/2015 | Kushwah | G06F 11/1469 |
| | | | | 707/646 |
| 2004/0260898 | A1* | 12/2004 | Stanley | G06F 11/1451 |
| | | | | 711/162 |

FOREIGN PATENT DOCUMENTS

WO   2012149220 A2   11/2012

OTHER PUBLICATIONS

Extended European Search Report for corresponding European Application No. 14184344.1, dated Feb. 27, 2015.
International Search Report for corresponding International PCT Application No. PCT/EP2015/068227, dated Oct. 23, 2015.

* cited by examiner

*Primary Examiner* — Aracelis Ruiz
(74) *Attorney, Agent, or Firm* — Workman Nydegger (57) ABSTRACT

A method for migrating data from a source storage system to a destination storage system comprises the following steps. In a first step, an initial copy is performed. In a second step, one or more incremental copies are performed and then a final cutover incremental copy is performed. The performing the one or more incremental copies further comprises excluding from a respective one of the one or more incremental copies first data portions of the data that are likely to change before this performing a final cutover incremental copy.

15 Claims, 8 Drawing Sheets

DATA MIGRATION TOOL WITH INTERMEDIATE INCREMENTAL COPIES

FIELD OF THE INVENTION

In general, the invention relates to the field of data migration tools. Such tools aid in the automated migration of digital data from a source storage system to a destination storage system.

More particular, the invention relates to the migration of huge amounts of data where a single copy of all data on the source storage system to the destination storage system may last in the order of days, weeks or even months.

BACKGROUND OF THE INVENTION

The need for data storage capacity is increasing rapidly every year. Today, a company's storage system may be distributed over different locations and comprise multiple server racks in one or multiple data centres where each rack houses multiple storage servers. Some companies outsource their storage needs to external storage providers offering cloud based storage solutions.

At some point in time, a storage system user may decide to migrate his data from its current storage system to a new one. This decision may be driven by several factors. A first factor may be financial considerations, where the new storage system provider offers the same or more capacity for a better price. Another factor may be that the capacity of the current storage system can no longer be increased and a migration to a new and larger storage system is inevitable.

In all of these cases, a data migration is to be performed, i.e., all data on the source system needs to be copied to the destination system and, at some point in time, users need to be switched to the new destination system. During the actual switch or cutover, the users are typically denied access to both storage systems in order to ensure data integrity. This way users cannot write to data that is being copied which could cause data corruption or users cannot write to a data location that has already passed the migration which could cause data loss.

For large storage systems serving tens of Terabytes up to several Petabytes of data, a single copy of all data may take in the order of days, weeks or even months. Denying user access to the storage system for such a long time is simply unacceptable and thus solutions are needed to shorten the switchover or cutover time.

WO12149220A discloses the concept of incremental copies to shorten the actual cutover time. First, an initial or baseline copy is made of all data to be migrated from the source to the destination system. Then, one or more incremental copies are made before the actual switchover. An incremental copy only considers the differences between the source and destination system. It thus applies all changes from the users that are still using the source storage system. During the initial copy and incremental copies, the users are still allowed access to their data on the source storage system. Then, at a certain planned point in time, the actual cutover is performed. During the cutover, the users are denied all access from the storage systems and a last or cutover incremental copy is made. When the cutover copy is done, the users are switched to the new destination storage system and can again access their data.

Although the above concept greatly reduces the actual cutover time, it is still an object to further shorten the cutover time.

SUMMARY OF THE INVENTION

This object is achieved by a computer implemented method for migrating data from a source storage system to a destination storage system comprising the step of performing an initial copy, subsequently performing one or more incremental copies and subsequently performing a final cutover incremental copy. This performing one or more incremental copies further comprises excluding from a respective one of the one or more incremental copies first data portions of the data that are likely to change before this performing a final cutover incremental copy.

After the initial copy or baseline copy of all data that is being migrated, one or more incremental copies are made. In an incremental copy, the differences in data between the source storage system and the destination storage system are applied to the destination storage system. An incremental copy may comprise the copying of a data portion from the source to the destination, a deletion of a data portion in the destination or an update of a data portion in the destination. The data comprises a plurality of data portions, which are defined as units of data that are copied from the source to the destination system. In typical data storage systems such a data portion is a file residing hierarchically structured in a file system and the data is thus copied on a file by file basis. At the end, the actual cutover is performed and a last incremental copy referred to as the final cutover incremental copy is made. After a successful cutover, users may start using the destination storage system. Typically, users are denied access to both storage systems during the cutover to ensure data integrity.

When a certain incremental copy is made or prepared, it is checked whether a data portion is still likely to change before the cutover and is excluded from the incremental copy when it is. If a data portion is likely to change in the future before the cutover, it will anyhow end up in a future incremental copy or in the cutover copy and it is thus not necessary to already include it in the current incremental copy. When data is excluded from an incremental copy, the copy is also referred to as a partial incremental copy.

By excluding data portions from the incremental copies that will anyhow be included in the final cutover copy, the incremental copies are smaller in size and can thus be executed in a shorter time period. When an incremental copy is smaller, less changes will be made by the users up till the next incremental copy and also up till the final cutover copy. This way, the final cutover copy is smaller and thus takes less time to execute. It is thus an advantage that the cutover time where users might have no access to the storage system is reduced.

It is a further advantage that less data is copied from the source to the destination system thereby saving in bandwidth.

The performing an initial copy may further comprise excluding second data portions of the data from the initial copy that are likely to change before the performing the final cutover incremental copy.

The same principle of excluding data portions is thus applied to the full initial copy thereby also reducing the size and duration of this first copy.

Advantageously, the final cutover incremental copy is performed when a transfer size of the one or more incremental copies has reached a steady state.

The incremental copies will typically decrease in transfer size and transfer time till they reach a certain steady state in transfer size, i.e., up to a moment where the transfer size and/or time of subsequent incremental copies are substantially the same. At the time of the first initial copy, there is no data yet on the destination storage system. The transfer size of this first initial copy may thus be very large taking days to months to execute for large storage systems. The transfer size of an incremental copy depends on the duration since the previous copy. As the transfer time of the initial copy is so large, the first incremental copy will still be considerably large. Every subsequent incremental copy will then decrease in size until a certain steady state in transfer size and time.

By performing the cutover after this steady state has been reached, the cutover time is further reduced.

According to an embodiment, the excluding of first and/or second data comprises retrieving metadata associated with data portions of the data on the source storage system wherein the metadata is indicative for a likelihood that a respective data portion will change before the final cutover incremental copy. The excluding further comprises selecting the first and/or second data portions based on this metadata.

Metadata is available information about the data portions that provide an indication if the data portion is likely to change before the cutover.

A first type of metadata may be available from the source storage system itself. One example of this first type is the type of a respective data portion or a file type if the data portion corresponds to a file. A predetermined list of file types may then be used to decide whether a data portion is likely to change. For example, .pst files which are typically used for storing an email database may be excluded from the incremental copies A second example of the first type of metadata is a change history of a data portion or a file. Files that are changed often or still changed after a certain predetermined time may then be excluded from the incremental copies.

A third example is a directory path of the data portion. It may then be decided beforehand that files in a certain directory location should be excluded from the incremental copies.

A fourth example is the read and write privileges of a data portion. Read-only data portions may always be included in the incremental copies.

Another example is file ownership where files belonging to certain users are excluded or included in the incremental copies because certain users, be it actual persons or system processes, may be more active than others.

According to a further embodiment, the method further comprises performing an intermediate incremental copy wherein no data portions are excluded and using a duration of this intermediate incremental copy as an estimate for a duration of the final cutover incremental copy.

The cutover itself is a crucial moment in the migration procedure. For large organisations it may be planned months in advance. Typically they are planned in the weekends to minimize the impact on the organization's productivity. To guarantee and plan the completion of the cutover it is important to know how long the final cutover incremental copy will take. As the partial incremental copies that are taken before exclude some of the data portions they are not a good indication for the cutover duration. Therefore, an intermediate incremental copy without excluding data portions is performed for which the duration provides a good estimate of the duration for the cutover copy.

Advantageously, the performing and intermediate incremental copy is executed on a same day of the week as when the performing a final cutover incremental copy is planned.

More advantageously, the performing an intermediate incremental copy is executed on a same hour of the day as when the performing a final cutover incremental copy is planned.

The duration of an incremental copy may depend on the time when it is performed. Therefore, by planning it on the same day and/or hour as the final cutover, a better estimate is obtained.

This performing an intermediate incremental copy may then be executed when a transfer size of the one or more incremental copies has reached a steady state.

When the final cutover copy is performed after a steady state of the incremental copies, a good estimate by the intermediate copy is ensured by also performing the intermediate incremental copy when a steady state in transfer size of the incremental copies that were taken before is achieved.

According to a particular embodiment, the performing an initial copy and/or performing one or more incremental copies and/or performing a final cutover incremental copy and/or performing an intermediate incremental copy comprises: scanning all or part of the data to be migrated on the source storage system and/or scanning all or part of the data on said destination storage system which was already copied and creating a list of commands for executing the performing. Then, subsequently executing the list of commands.

First, a list of all the commands to execute the copies is created and then the commands are executed. As the list of commands is known before the actual execution, the progress of the actual copy is known when being executed as the progress of the copy may be derived from the current position in the list of commands.

According to a second aspect, the invention relates to a computer program product comprising computer-executable instructions for performing the method according to the first aspect when the program is run on a computer.

According to a third aspect, the invention relates to a computer readable storage medium comprising the computer program product according to the second aspect.

According to a fourth aspect, the invention relates to a data processing system programmed for carrying out the method according to the first aspect.

DETAILED DESCRIPTION OF EMBODIMENT(S)

Figure 2:
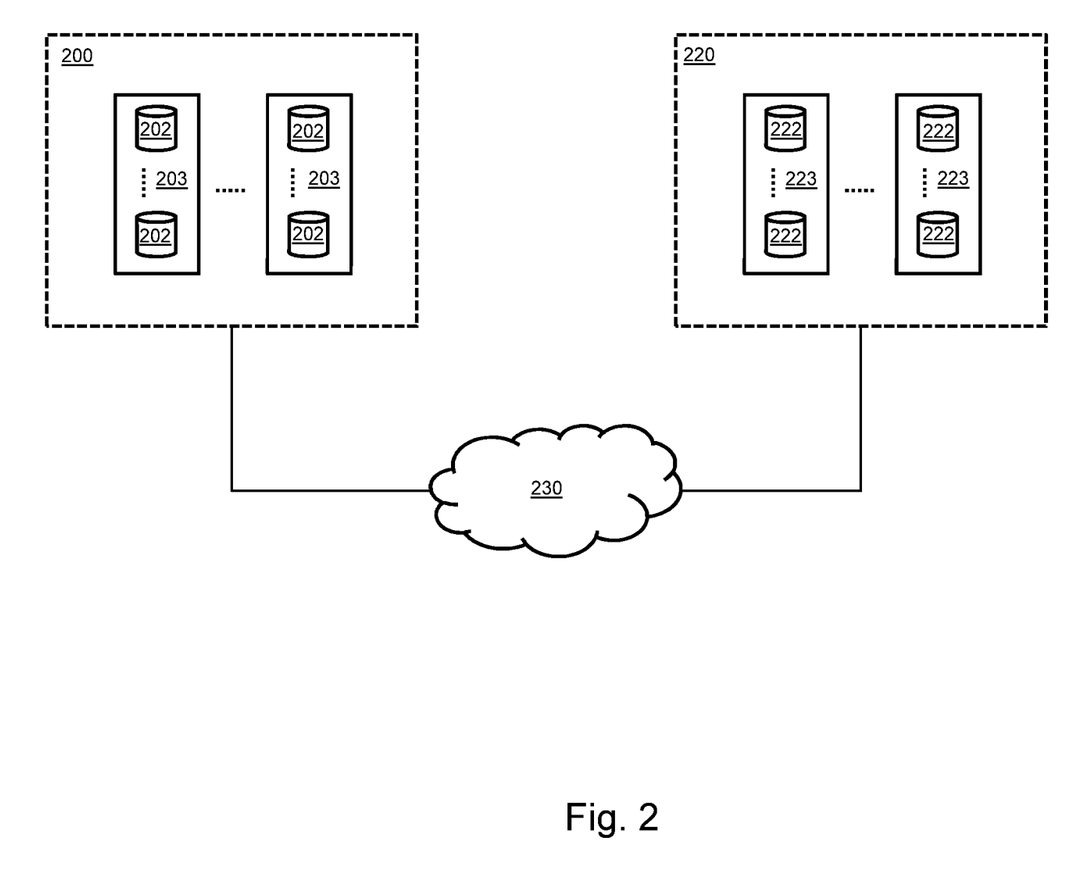
FIG. 2 illustrates an example of a source and destination storage system.

The current disclosure relates to data migration between data storage systems and more particular the data migration from a source storage system to a destination storage system. FIG. 2 illustrates an exemplary embodiment of such a source 200 and destination 220 storage systems. The source storage system comprises a plurality of storage servers 203 each housing one or more digital storage means 202. Similarly the destination system comprises a plurality of storage servers 223 each housing one or more digital storage means 222. The storage servers 203 and 223 may be housed in a same or different data centre inside or outside a company's data network. The storage systems 200 and 220 can offer data storage and access to users and services. Such access may be done over the network 230. Various protocols may be used for accessing the data such as for example CIFS, SMB, FTP or NFS. Companywide storage systems may offer a huge data storage capacity and are often deployed and maintained by external storage providers such as for example NetApp, EMC or Hitachi.

The data to be migrated from the system 200 to the system 220 typically comprises a set of data portions, which in the most common case will be files organized according to a file system. These files may be data files belonging to users or groups, system files used by an operating system or applications files used by and for applications.

In the embodiments below various steps are provided for performing a data migration from a source system 200 to a destination storage 220. When referring to data, it does not necessarily refer to all data on the storage system. The data may first be split in several chunks of data and a data migration may then be performed for each chunk of data as disclosed by the embodiments below. Such a chunk may for example comprise all data belonging to a certain department of an organization or to a specific subdirectory or mounting point of a file system.

Figure 3:
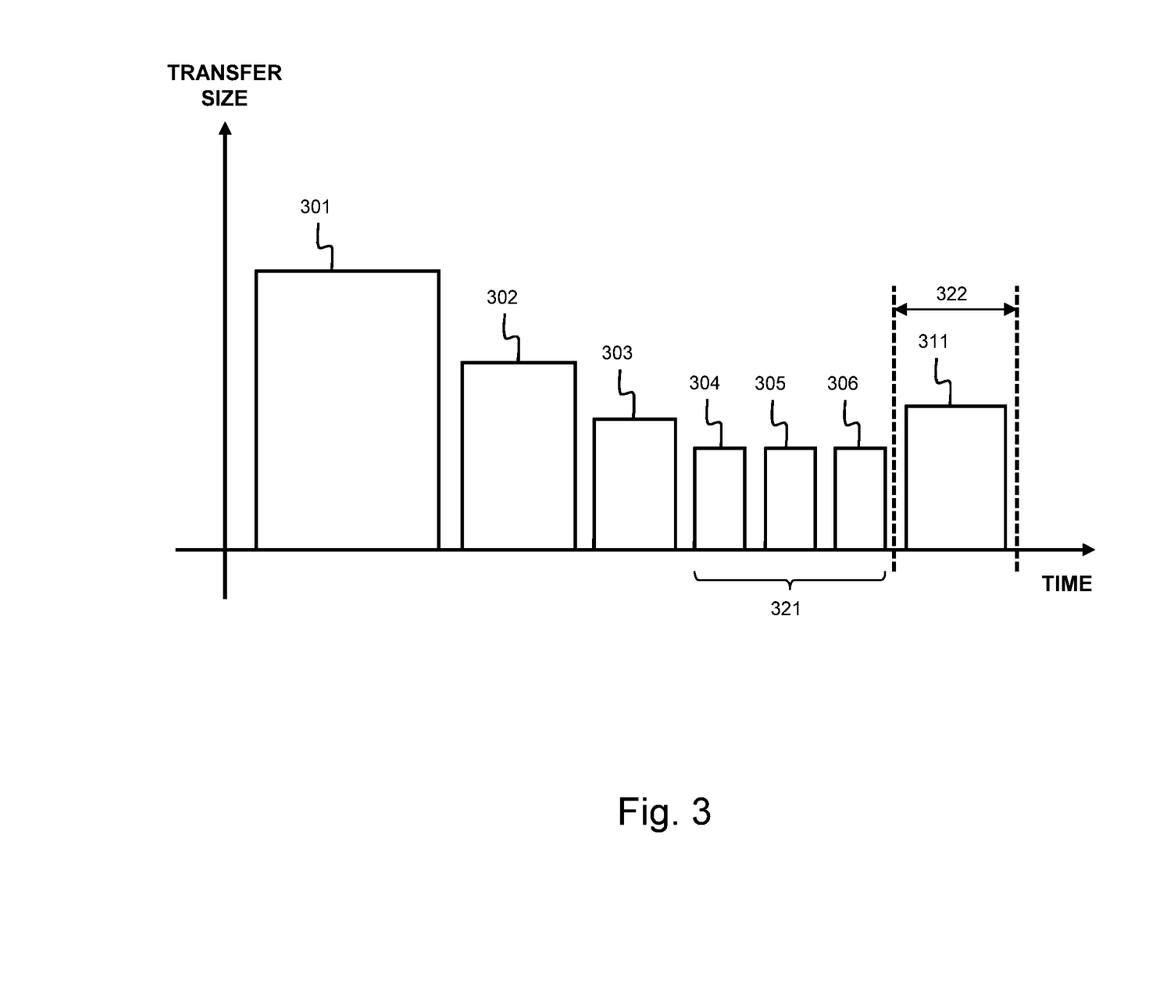
FIG. 3 illustrates an example of the transfer time and transfer size of data copies from a source storage system to a destination storage system according to an embodiment.
Figure 4:
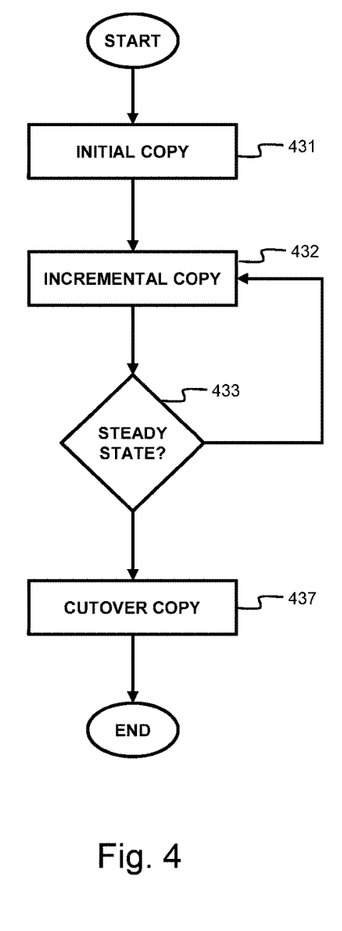
FIG. 4 illustrates steps of a method for performing a data migration from a source to a destination storage system according to an embodiment.

FIG. 4 illustrates steps for performing a data migration according to an embodiment of the invention. The steps are further illustrated by FIG. 3 where the transfer size and transfer time of copies 301-311 from the source storage system 200 to the destination storage system 220 are illustrated.

At some point in time, a data migration is started. Before and during the migration data storage is still provided from the source data storage system. During the migration the destination storage system is populated with copies of the data. At the end of the migration, during the cutover or switchover, all user access is denied to both source and destination storage systems and the last bits of data are copied to the destination storage system. Then, all users are given access to their data on the destination storage while the source storage system can be taken out of business. By the cutover where access is denied, data integrity is guaranteed.

In a first step 431 an initial copy of the data is performed. In FIG. 3 this initial copy is illustrated by the block 301 where its width represents the time it takes to perform the initial copy and its height represents the data size of the transfer. For typical large data migrations, such an initial copy can take several days, weeks or even months. Apart from the size of the data, the transfer time will also be restricted by the available bandwidth for transferring the data between the source 200 and destination 220.

According to an embodiment, the initial copy 301 comprises all data that is to be migrated. In the first step 431 all data portions making up the data are thus copied from the source storage system 200 to the destination storage system 220.

According to an alternative embodiment, data portions that are likely to change before the cutover are excluded from the initial copy 301. As the data portions are still likely to change, a new copy will anyhow have to be made before or during the cutover. Therefore, by excluding such a data portions from the initial copy, the initial copy will take less time to perform and network bandwidth is saved.

After performing the initial copy in step 431, one or more incremental copies 302 to 306 are made until the start of the actual cutover. During an incremental copy only differences between the source and destination system 200 and 220 are applied to or copied to the destination system 220. In FIG. 3, the first incremental copy is illustrated by block 302. If a data portion on the source has already a copy on the destination that was copied there during the initial copy 301, the data portion is thus not copied during the incremental copy. Therefore, the incremental copy 302 will be smaller than the initial copy 301 as it is unlikely that all files on the source storage system will have changed. Moreover, data portions that are likely to change before the cutover are excluded from the incremental copy 302. As the data portions are still likely to change, a new copy will anyhow have to be made before or during the cutover. Therefore, by excluding such a data portions from the incremental copy, the incremental copy will take less time to perform and network bandwidth is saved. An incremental copy that excludes certain data portions is also referred to as a partial incremental copy in the current disclosure.

The step 432 of performing the incremental copies may be repeated several times until the cutover. During a next incremental copy, data portions that were excluded before may now be copied or the other way around. Depending on the criteria used, it could be that a data portion that was previously classified as 'likely to change' is re-evaluated as 'not likely to change' during a subsequent iteration. Preferably, the step 432 is repeated at least until the transfer size of the incremental copies has reached a steady state. In FIG. 3 the incremental copies 304, 305 and 306 have reached a steady state with regards to their transfer size. This effect is caused by the dependency of the transfer size of an incremental copy on the transfer time of the previous copy. Incremental copy 304 thus depends on the transfer time of the copy 303, 303 depends on 302 and 302 depends on its turn on the transfer time of the initial copy. As the transfer time of the initial copy was large, it takes a few iterations before the incremental copies 302-306 have reached a steady state.

Then, in step 437, the actual cutover copy is performed during the actual cutover 322, preferably after a steady state is reached according to the condition 433. During this cutover 322, all access to the data is denied and a final cutover incremental copy 311 is made. The final cutover incremental copy is similar to the previous partial incremental copies except that no files are excluded. After the cutover 322, users are again granted access to the data, but now on the destination storage system 220.

By excluding files from the incremental copies, the transfer size and thus also the transfer time of the incremental copies has been reduced. As the size of the final cutover incremental copy depends on the previous incremental copy, also the transfer time of the final copy will be reduced.

In data migration, planning is of crucial importance. Typically, a cutover is performed during a weekend when less users are affected by denied access to their data compared with working days. In order to verify that the cutover can be finalized in a desired time window, a good estimate for the duration of the cutover copy is important.

Figure 1:
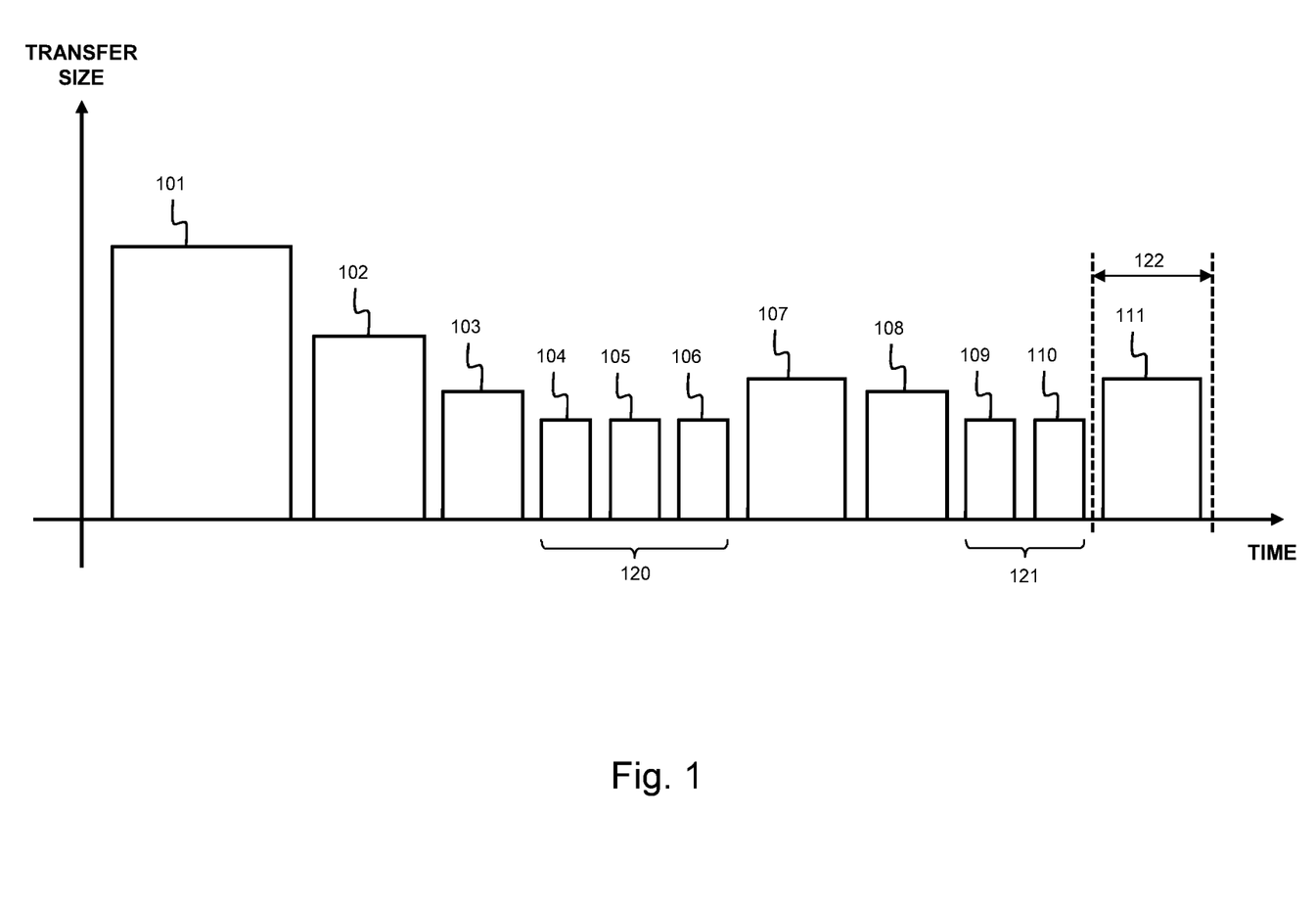
FIG. 1 illustrates an example of the transfer time and transfer size of data copies from a source storage system to a destination storage system according to an embodiment.
Figure 5:
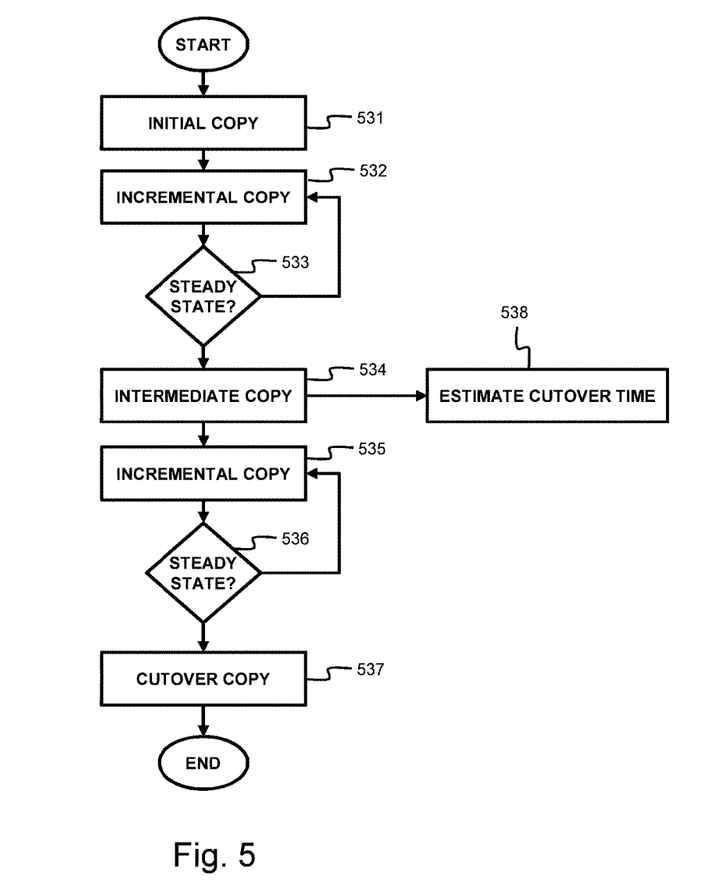
FIG. 5 illustrates steps of a method for performing a data migration from a source to a destination storage system according to an embodiment.

FIG. 5 together with FIG. 1 illustrates the use of an extra intermediate incremental copy 107 in order to estimate the duration 122 of the cutover copy 111 according to an embodiment. The first step 531 is similar to step 431 where an initial full or partial copy 101 is made. Then, in step 532 a first set of partial incremental copies 102 till 106 are made. When these copies have reached a steady state 120 according to the condition 533 where their transfer size is substantially the same as the transfer size of the previous partial incremental copy, a dry run of the cutover copy is performed in step 534. During this step, an incremental copy is made without excluding any data portions thereby mimicking the final cutover incremental copy. In other words, the transfer size and time of this intermediate copy 107 is used to estimate 538 the duration of the final cutover copy 111. This estimate can then be used to see if the cutover can be done as planned. If the estimated cutover period takes too long, more time can be allocated for the cutover or a smaller chunk of data can be defined for the migration.

Preferably, the intermediate incremental copy 107 is performed on the same day and even more preferably on the same hour as the planned cutover copy 111. This assures that time dependent factors such as the available bandwidth for the data transfers match as close as possible to the cutover. Advantageously, only the data migration of a single data chunk is performed during both the intermediate copy 107 and the cutover copy 111 to ensure a short transfer time and a good estimate.

After the intermediate copy in step 534, one or more partial incremental copies 108-110 are again performed in step 535 until a steady state 121 in the transfer size of the incremental copies is reached again according to the condition 536. Then, the cutover copy 111 is performed in step 537 similar to step 437

Figure 6:
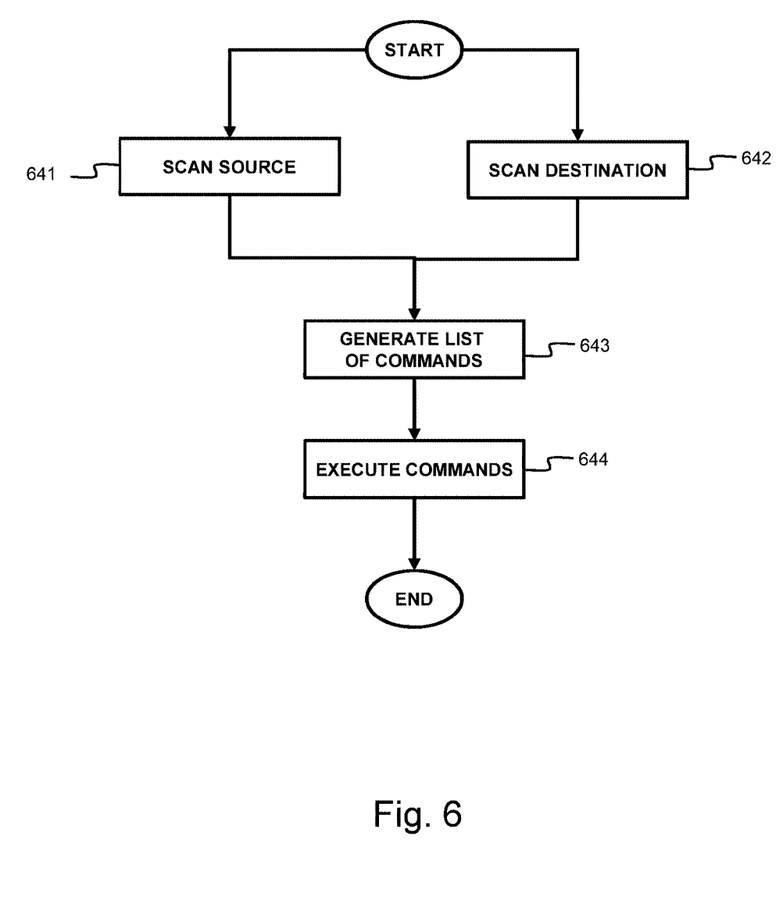
FIG. 6 illustrates steps of a method for performing a copy of data from a source to a destination storage system according to an embodiment.

FIG. 6 illustrates steps to perform a copy of data during a date migration from the source storage system 200 to the destination storage system 220 according to an embodiment. These steps may be executed to perform the initial copy or partial initial copy according to steps 431 and 531, to perform the incremental copy according to steps 432, 532 or 535, to perform the intermediate dry-run incremental copy according to step 534 or to perform the final cutover incremental copy in steps 437 and 537.

In step 641, the metadata of the source storage system is retrieved and scanned and in step 642 the metadata of the destination storage system is retrieved and scanned. Then, in step 643 a list of commands is generated by comparing the scanned metadata. Such commands may comprise:
  An instruction to copy a data portion from the source storage system to the destination storage system.
  An instruction to delete a data portion from the destination storage system.
  An instruction to update the metadata of a certain data portion on the destination storage system such as for example user rights, ownership and author information.

Then, in the last step 644 the list of commands is executed thereby performing the actual copy of the data.

It is not always necessary to fully perform the steps 641 and 642, i.e., it is not necessary to fully scan both source and destination storage systems. For example, a list with changes since the previous iteration may be obtained from the source system. Additionally, the state of the destination storage system may be derived from one of its previous states or index and the outcome of the previous commands in order to calculate the new system state. If this information is available, the list of commands can be derived in step 643.

Figure 7:
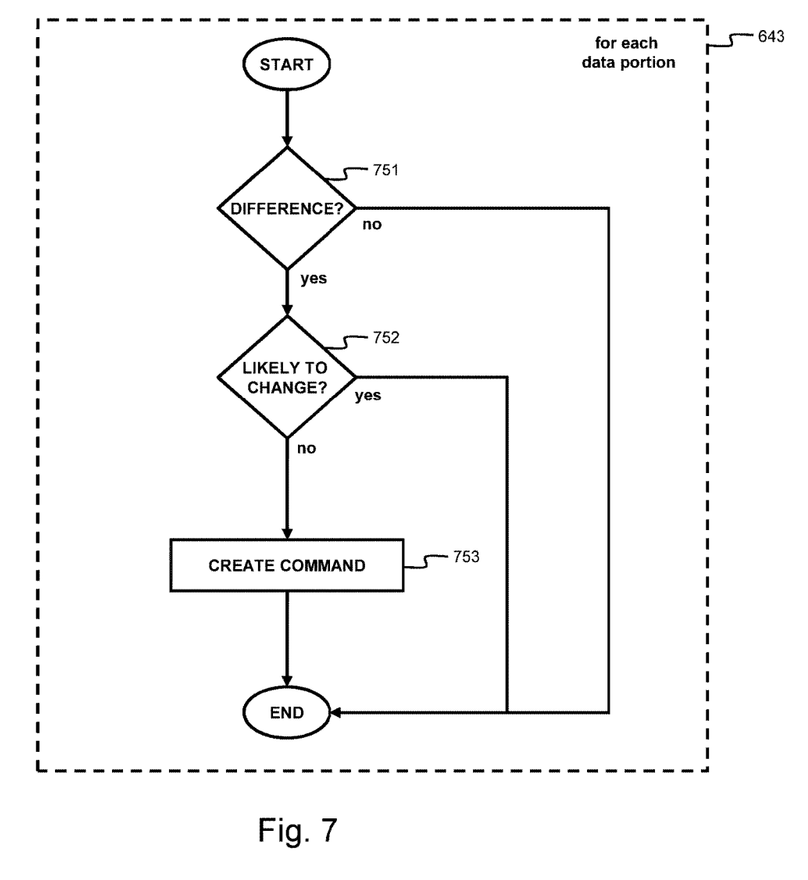
FIG. 7 illustrates steps of a method for generating a list of commands for performing a copy of data from a source to a destination storage system according to an embodiment.

FIG. 7 illustrates steps performed for generating 643 the list of commands according to an embodiment for the case where data portions are to be excluded to perform a partial incremental copy. The illustrated steps are performed for every data portion on the source storage system 200. In the first step 751, it is checked whether there is a difference between the data portion on the source and the destination based on the associated metadata that was scanned in the steps 641 and 642. This check may comprise:
  The data portion is present on the source storage system but not on the destination storage system.
  The data portion is present on the destination storage system but not on the source storage system.
  The data portion is present on the destination storage system, but its metadata such as the file change history indicates that the data portion on the source storage system was changed.
  The data portion is both present on the source and destination system and its content is unaltered, but some of its metadata has changed. For example, a data file may be unchanged, but user rights may be different.

If a difference is detected, the method proceeds to the next step 752, otherwise, the data portion nor its metadata has changed and no command needs to generated for the respective data portion. In this next step 752, it is checked whether the respective data portion is likely to change before the cutover. If it is likely to change and even though there is a difference for this data portion between the source and destination storage system, no further command is generated and this data portion is skipped from the copy.

There are several possibilities for detecting this likelihood from the scanned metadata and these may further be combined. Some examples according to an embodiment are:
  The type of the data portion such as the file type is checked against a predetermined list of types that are excluded from the copies. This list then comprises file types that typically hold data that is likely to change a lot. Such file types may for example be mailbox file types, database file types, system files of an operating system and cache files for storing temporary data.
  The owner or group to which a file belongs is checked against a predetermined list of users and groups.
  The change history of a file is checked. If the file has been recently changed, for example after a certain date, the file is excluded from the copy.
  It is checked whether the location of a file is within a set of predetermined locations.
  Such a location may for example be a directory. This way locations in the directory system that are known to comprise files that change a lot can be excluded by default.

When it is determined under step 752 that the respective data portion is not likely to change, the method proceeds to step 753 where a command is generated depending on the detected difference under step 751. Such a command may for example be:
  Copy the respective data portion from the source to the destination storage system.
  Delete the respective data portion from the destination storage system.
  Update the metadata of the data portion on the destination with the metadata of the data portion on the source.

The steps of FIG. 7 are performed for all scanned data portions, both on the source and destination storage system resulting in the list of commands of step 643 in FIG. 6.

Figure 8:
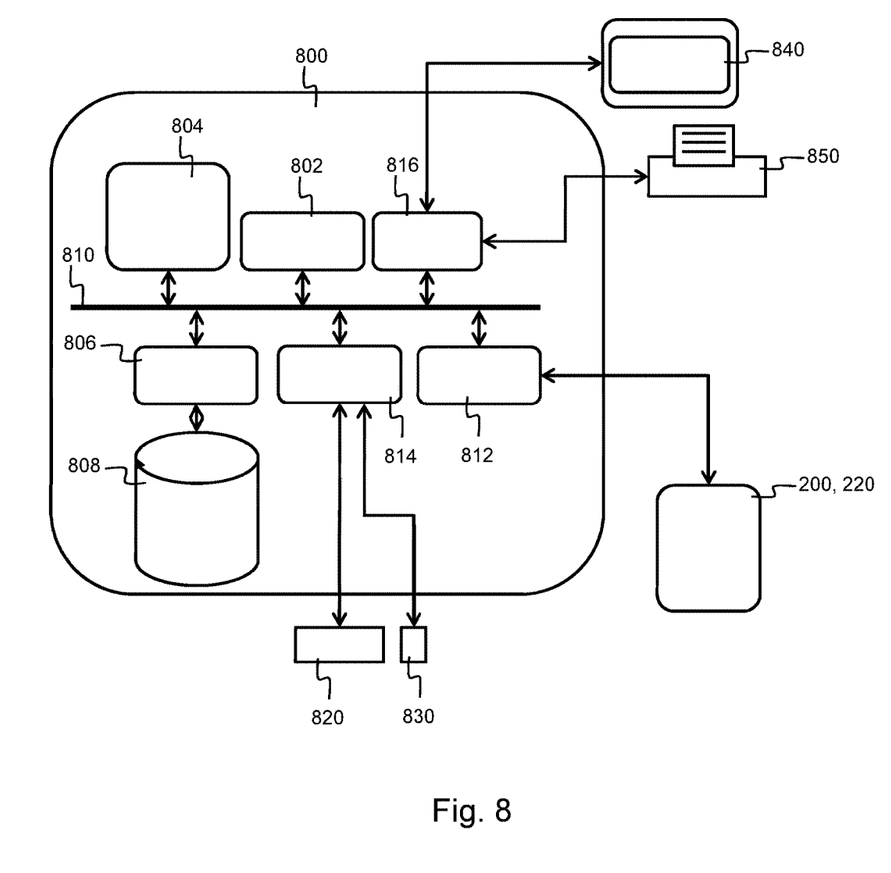
FIG. 8 illustrates an exemplary embodiment of a device for performing a data migration.

FIG. 8 shows a suitable computing system 800 for performing the steps according to the method of the above embodiments. Computing system 800 may in general be formed as a suitable general purpose computer and comprise a bus 810, a processor 802, a local memory 804, one or more optional input interfaces 814, one or more optional output interfaces 816, a communication interface 812, a storage element interface 806 and one or more storage elements 808. Bus 810 may comprise one or more conductors that permit communication among the components of the computing system 800. Processor 802 may include any type of conventional processor or microprocessor that interprets and executes programming instructions. Local memory 804 may include a random access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator to input information to the computing device 800, such as a keyboard 820, a mouse 830, a pen, voice recognition and/or biometric mechanisms, etc. Output interface 816 may comprise one or more conventional mechanisms that output information to the operator, such as a display 840, a printer 850, a speaker, etc. Communication interface 812 may comprise any transceiver-like mechanism such as for example one or more Ethernet interfaces that enables computing system 800 to communicate with other devices and/or systems, for example mechanisms for communicating with the source and destination storage systems 200 and 220 of FIG. 2. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above is described as a local disk, in general any other suitable computer-readable media such as a removable magnetic disk, optical storage media such as a CD or DVD, -ROM disk, solid state drives, flash memory cards, . . . could be used. The system 800 described above can also run as a Virtual Machine above the physical hardware.

The steps illustrated by the above embodiments can be implemented as programming instructions stored in local memory 804 of the computing system 800 for execution by its processor 802. Alternatively the instruction can be stored on the storage element 808 or be accessible from another computing system through the communication interface 812.

The system 800 may be connected to the network 230 of FIG. 2 by its communication interface 812. This way the system 800 has access to both the source storage system 200 and destination storage system 220 for executing the steps according to the various embodiments. The steps according to the above embodiments may also be performed as instructions on one of the servers 203, 223 where these servers have a similar architecture as the system 800 of FIG. 8.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer implemented method for migrating data from a source storage system to a destination storage system comprising the following steps:
   performing an initial copy; and
   subsequently performing one or more incremental copies; and then
   subsequently performing a final cutover incremental copy;
wherein said performing one or more incremental copies further comprises excluding from a respective one of said one or more incremental copies first data portions of said data that are likely to change before said performing a final cutover incremental copy.

2. The method according to claim 1 wherein said performing an initial copy further comprises excluding second data portions of said data from said initial copy that are likely to change before said performing said final cutover incremental copy.

3. The method according to claim 1 wherein said final cutover incremental copy is performed when a transfer size of said one or more incremental copies has reached a steady state.

4. The method according to claim 3 wherein said performing an intermediate incremental copy is executed when a transfer size of said one or more incremental copies has reached a steady state.

5. The method according to claim 1 wherein said excluding of first and/or second data comprises:
   retrieving metadata associated with data portions of said data on said source storage system; wherein said metadata is indicative for a likelihood that a respective data portion will change before said final cutover incremental copy;

selecting said first and/or second data portions based on said metadata.

6. The method according to claim 5 wherein said metadata comprises a file type of a respective data portion; and wherein said selecting of first and/or second data portions comprises selecting data portions of a predetermined file type.

7. The method according to claim 5 wherein said metadata comprises a change history of a respective data portion; and wherein said selecting of first and/or second data portions comprises selecting data portions that where changed after a predetermined time.

8. The method according to claim 1 further comprising:
performing an intermediate incremental copy wherein no data portions are excluded; and
using a duration of said intermediate incremental copy as an estimate for a duration of said final cutover incremental copy.

9. The method according to claim 8 wherein said performing and intermediate incremental copy is executed on a same day of the week as when said performing a final cutover incremental copy is planned.

10. The method according to claim 8 wherein said performing an intermediate incremental copy is executed on a same hour of the day as when said performing a final cutover incremental copy is planned.

11. The method according to claim 8 wherein said performing an intermediate incremental copy is executed when a transfer size of said one or more incremental copies has reached a steady state.

12. The method according to claim 1 wherein performing an initial copy and/or performing one or more incremental copies and/or performing a final cutover incremental copy and/or performing an intermediate incremental copy comprises:

scanning all or part of the data to be migrated on said source storage system and/or scanning all or part of the data on said destination storage system which was already copied; and subsequently creating a list of commands for executing said performing; and subsequently executing said list of commands.

13. A non-transitory computer program product comprising computer-executable instructions for performing the method according to claim 1 when the program is run on a computer.

14. The non-transitory computer readable storage medium comprising the computer program product according to claim 13.

15. The data processing system programmed for carrying out the method according to claim 1.

* * * * *